(12) United States Patent
Turan et al.

(10) Patent No.: US 12,045,028 B2
(45) Date of Patent: Jul. 23, 2024

(54) METHOD OF PROVIDING AN ENGINEERING BASED DIGITAL TWIN PLATFORM

(71) Applicant: SIMULARGE BILISIM VE MÜHENDISLIK TEKNOLOJILERI ANONIM SIRKETI, Istanbul (TR)

(72) Inventors: Büryan Turan, Istanbul (TR); Erhan Turan, Istanbul (TR)

(73) Assignee: SIMULARGE BILISIM VE MÜHENDISLIK TEKNOLOJILERI ANONIM SIRKETI, Istanbul (TR)

( * ) Notice: Subject to any disclaimer, the term of this patent is extended or adjusted under 35 U.S.C. 154(b) by 198 days.

(21) Appl. No.: 17/429,581

(22) PCT Filed: Dec. 10, 2019

(86) PCT No.: PCT/TR2019/051056
§ 371 (c)(1),
(2) Date: Aug. 9, 2021

(87) PCT Pub. No.: WO2021/118478
PCT Pub. Date: Jun. 17, 2021

(65) Prior Publication Data
US 2022/0137585 A1 May 5, 2022

(51) Int. Cl.
*G05B 19/05* (2006.01)
*G06F 11/34* (2006.01)
(Continued)

(52) U.S. Cl.
CPC ........ *G05B 19/054* (2013.01); *G06F 11/3409* (2013.01); *G06Q 10/10* (2013.01);
(Continued)

(58) Field of Classification Search
CPC .............. G05B 19/054; G06F 11/3409; G06F 2201/865; G06Q 10/10; G06Q 30/0603
(Continued)

(56) References Cited

U.S. PATENT DOCUMENTS

2004/0103312 A1* 5/2004 Messerges .............. G06F 21/10
726/10
2016/0247129 A1 8/2016 Song et al.
(Continued)

FOREIGN PATENT DOCUMENTS

WO 2019232154 A1 12/2019

OTHER PUBLICATIONS

International Search Report for corresponding PCT/TR2019/051056, dated Jun. 14, 2021.
(Continued)

*Primary Examiner* — Jigneshkumar C Patel
(74) *Attorney, Agent, or Firm* — Bayramoglu Law Offices LLC

(57) ABSTRACT

Disclosed is a method to create a digital twin which is a copy of a machine or a production system in a computer environment and usage of the created digital twin in the computer-based calculation. Digital twins which are developed by the method are created by physical laws/equations rather than solely by sensor data. Developed digital twins could be created/served with API's by dividing thereof into small pieces and could be resold through a market place in form of an application.

10 Claims, 2 Drawing Sheets

(51) Int. Cl.
*G06Q 10/10* (2023.01)
*G06Q 30/0601* (2023.01)

(52) U.S. Cl.
CPC .............. *G06Q 30/0603* (2013.01); *G05B 2219/13024* (2013.01); *G05B 2219/15116* (2013.01); *G06F 2201/865* (2013.01)

(58) Field of Classification Search
USPC .......................................................... 700/9
See application file for complete search history.

(56) References Cited

U.S. PATENT DOCUMENTS

| | | |
|---|---|---|
| 2017/0220011 A1 | 8/2017 | Hart et al. |
| 2018/0054376 A1 | 2/2018 | Hershey et al. |
| 2018/0210436 A1* | 7/2018 | Burd ................. G05B 23/0294 |
| 2019/0138970 A1 | 5/2019 | Deutsch et al. |

OTHER PUBLICATIONS

Written Opinion of the International Searching Authority for corresponding PCT/TR2019/051056, dated Jun. 14, 2021.

* cited by examiner

METHOD OF PROVIDING AN ENGINEERING BASED DIGITAL TWIN PLATFORM

TECHNICAL FIELD

The invention relates to a method in which a calculation is made by using the digital twin which is a copy of a machine or a production system in the computer environment.

The invention is particularly related to the usage of a new scientific approach in the digital twin creation method.

STATE OF THE ART

The digital twin phrase is the name given to the copy of a machine or a system in the computer environment. Digital twins are virtual solutions which mimics the physical behavior of machines. In order to maximize production efficiency and reduce costs that are encountered in the industry, digital twins are used to compute best performing parameters. The user performs engineering calculations via digital twins to understand the production system, increase the efficiency of the system, reduce costs, improve quality etc.

In the present state of the art, digital twin solutions use Big Data Analytics and Machine Learning (ML) methods. The Big Data, which constitutes of large amount of data, is obtained by data collection during a determined period of time from the sensors installed on the production line. The collected data are subjected to machine learning algorithms to estimate the behavior of the production line and thus create the digital twin of the machine. In these solutions, the accuracy in reflection of real physical situation of the digital twin depends on the success of the machine learning. The machine learning is based on a trend of the data within a determined interval rather than the physical basis. For this reason, at physical conditions of the outside the interval in which data is collected, for example when ML algorithm is trained with the data obtained from the production line at 1-2 m/s interval, misleading results may occur while estimating the behavior of the production line at 3 m/s. In a similar manner, when a new type of raw material is requested to be tested with this digital twin; the digital twin cannot reflect the behavior of the product line with this new type of material since there is no existing data/information collected from the production line under this condition. New set of data should be collected from the production line with new type of raw material installed, and then Machine Learning algorithms should be trained with this new data set in order to obtain an accurate digital twin. Therefore, creation of Digital Twin with Big Data is an approach which results in disadvantages such as stopping the line; additional data collection period, additional operations and additional costs etc.

In the patent document No US20160247129A1 in the present state of the art, a production system simulation method is mentioned wherein a platform and a plurality of digital twins are used. In the method mentioned in this document, the usage of each digital twin for the simulation of machines located at different locations and the transmission of the received data by means of digital twins to the common platform are disclosed. However, in this method, creation of digital twins only by means of the physical/mathematical data rather than solely by the sensor data and presentation of the digital twin applications in the platform and creation of applications via API's are not mentioned.

Also, another patent document No US20170220011A1 is included in the present state of the art, an "industrial internet application" developed for the mobile devices are disclosed. Said application enables the synchronization of the data of a plurality or a part of industry system over the cloud. However also in this document, creation of the digital twins only by means of the physical/mathematical data rather than solely by the sensor data and presentation of the digital twin applications in the platform and creation of applications via API's are not mentioned.

As a result, due to the abovementioned disadvantages and the insufficiency of the current solutions about the subject matter, a development is required to be made in the relevant technical field.

PURPOSE OF THE INVENTION

The invention aims to solve the abovementioned disadvantages by the help of being inspired from present conditions.

The main purpose of the invention is to apply a different method in order to create digital twins and to use these created digital twins in calculation.

Another purpose of the invention is to enable faster development of digital twins by combining the mathematical methods and cloud technology together which are used in different areas in the engineering field.

Another purpose of the invention is to develop a digital twin having a structure which is useful and could be easily adaptable to the changes in the production line.

Another purpose of the invention is to serve a digital twin by means of API's by dividing thereof into small pieces, thus, to develop new digital twin applications by developers in an easy manner.

A purpose of the invention is to create a digital twin of each component of the production lines/sections in a separate manner and to market thereof from a market place as application.

In order to fulfill the purposes mentioned above, the computer-based calculation system subject to the invention comprises the following process steps;

entering to an online platform by the user with a second device which is owned by the user, entering to the market place on an online platform by the user in order to browse applications which make engineering calculations and are sold here, querying the requested application on the market place by the user, matching the application to the production system which yields the digital twin of the system by the API consisting built-in functions, solvers, mathematical codes, recursive codes and loops performing requested calculations with the digital twin application by the user, taking actions on the production line such as changing operation parameters by the user or by the application and, exiting out of the market place by the user.

The structural and characteristic features of the present invention will be understood clearly by the following drawings and the detailed description made with reference to these drawings and therefore the evaluation shall be made by taking these figures and the detailed description into consideration.

FIGURES CLARIFYING THE INVENTION

DESCRIPTION OF PART REFERENCES

Figure 1:
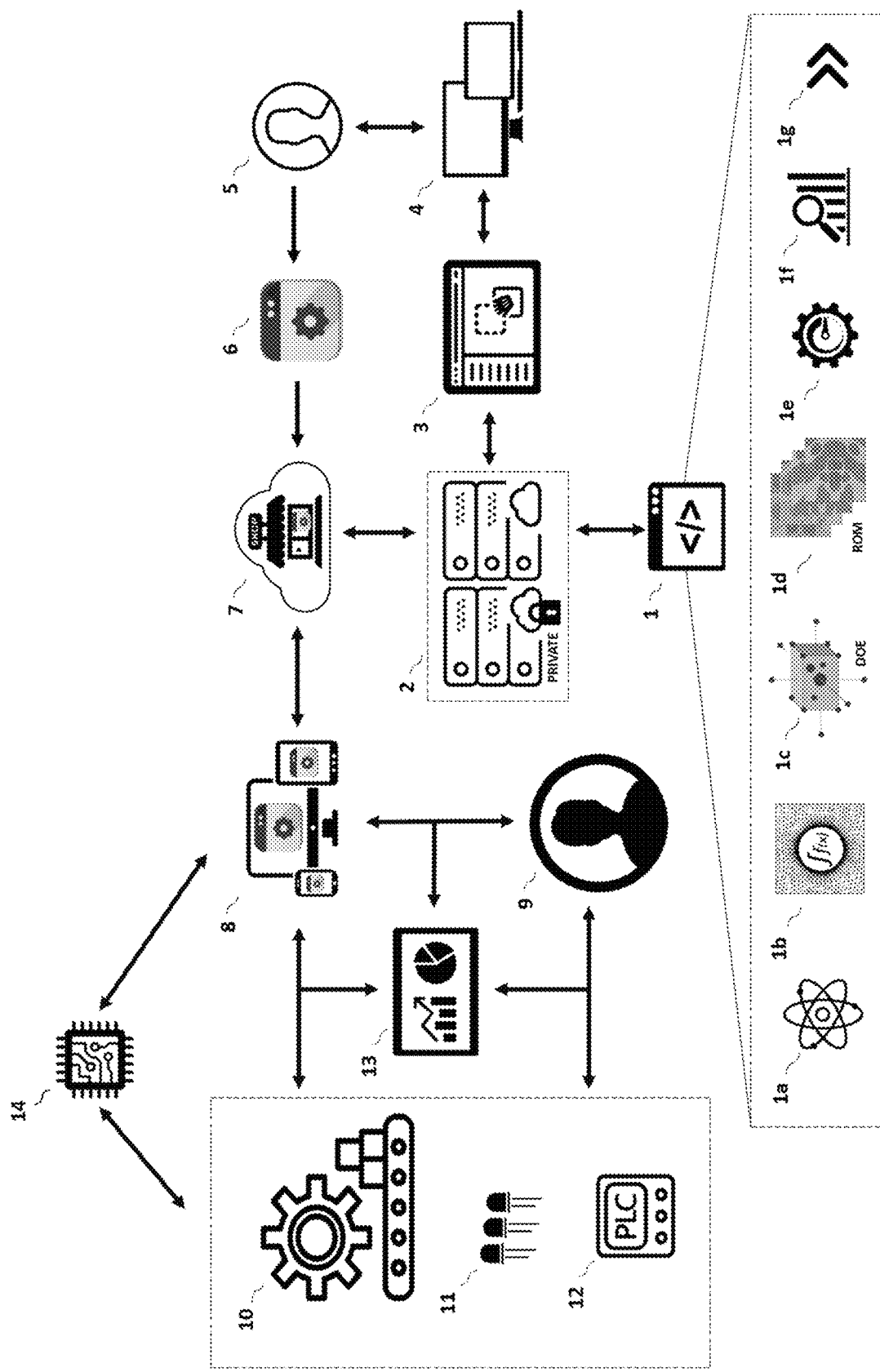
FIG. 1 is a schematic view of an exemplary embodiment in which computer-based calculation method subject to the invention is used.

1. API
2. Server
3. Developer interface
4. First device
5. Developer
6. Application
7. Market place
8. Second device
9. User
10. Production lines/machines
11. Sensors
12. PLC
13. Performance indicator interface
14. Edge computing device 1a. forming equations which represent the physical state of machine's processes in the production system
1b. using numerical methods in order to solve the physical equations
1c. performing virtual tests to generate data set with varying input parameters by Design of Experiment codes
1d. simplifying data set with Reduced Order Modeling process, reducing input-output relationship to a few simple functions
1e. matching the behavior of the reduced functions to physical behavior of the system with sensor data from production lines/machines and obtaining digital twin by means of calibration thereof
1f. calculating the optimum operation parameters via calibrated digital twin by using multi-objective optimization codes
1g. transforming the application into an API by adding supplementary codes
1001. entering to an online platform by the user with a second device which is owned by the user
1002. entering to the market place on the online platform by the user in order to browse applications which make engineering calculations and are sold here
1003. querying by the server whether the private domain is requested by the user or not
1004. performing user subscription processes for creating a private domain by the server
1005. querying by the server whether the user requires the ecosystem feature which enables interaction with other users or not
1006. integrating the partner companies in the ecosystem to the private domain of the user by the server
1007. querying the requested application on the market place by the user
1008. asking by the server to the user whether the user requires the requested application to be developed or not
1009. developing the application by an interface on the server by the developer
1010. asking the user whether the calibration process of the application with the physical system should be carried out manually by the server or not
1011. introducing the parameters and the data collected from production system comprises the production lines/machines, sensors and PLC to the application by the user
1012. connecting the production system to the application by the user
1013. matching the application to the production line/machine/system which yields the digital twin of the system by the API consisting built-in functions, solvers, mathematical codes, recursive codes and loops
1014. performing requested calculations with the digital twin application by the user
1015. asking the user whether the obtained operation parameters could be applied to the production system manually by the server or not
1016. introducing the parameters received from the application to the system by the user
1017. connecting the application to the production system
1018. monitoring metrics in respect to the use of the application and its impact on the performance of the production system through a performance indicator interface by the user
1019. exiting out of the market place by the user.

DETAILED DESCRIPTION OF THE INVENTION

In this detailed description, computer-based calculation method subject to the invention is described for clarifying the subject matter.

In FIG. 1, a schematic view of an exemplary system in which computer-based calculation method is seen.

An application programming interface or (its abbreviation) API (1); is an interface or communication protocol between different parts of a computer program that is intended to simplify the implementation of software. An API specification can take many forms, but often includes specifications for routines, data structures, object classes, variables, or remote calls. Here, API structure is utilized for the development and usage of applications (6) which perform engineering calculations. The API (1) is a gateway to scientific and mathematical codes for developing the computation programs/tools of the engineers or other relevant professionals dealing with physics-based problems related to systems such as machines, planes, constructions etc. In this invention, computation tools are developed in form of applications (6) with the use of API's (1). API (1) can also contain codes for creating signals, connecting devices, calibrating functions, collecting data and controlling devices/machines.

A server (2) in the exemplary system is a hardware which has a digital data storing and distributing characteristic. Processes such as storing the API (1), storing the applications (6), storing the user (9) information, distributing the API (1), publishing the market place (7) and the API (1) are performed through this hardware. This hardware can be included in the cloud and also can be a hardware which is positioned (on-premise) physically in the company. In the server (2), a private domain can be provided upon the requirement of the user (9). The applications (6) developed in the private domain can be kept isolated from the market place and the users (9) can share their applications (6) in this private domain by inviting their stakeholders, suppliers who use similar production methods. The user (9) can follow the metrics of both himself/herself and stakeholders through the performance indicator interface (13) (dashboard).

In the exemplary system, Developers (5) use a developer interface (3) over a first device (4) which they have for developing an application (6). The developers (5) can easily develop a product and publish the developed products by the help of the "drag & drop" and "command window" features in the developer interface (3). Also, applications (6) included in the library of the server (2) can be combined with other applications or codes on the developer interface (3) and these integrated codes can be transformed into another application with the help of the API (1). The first device (4) that belongs to the developer (5) can be a mobile device such as a telephone, tablet etc. or can be a laptop or desktop computer.

The applications (6) performing the engineering calculations created by the developers (5) can be a digital twin of any production machine or process. Also, different digital twin applications (6) can be developed for different sections of a production line. Beyond digital twin applications, engineering applications (6) can be developed which models any situation in terms of engineering.

Developed applications (6) can be sold or shared in online market places (7). The applications (6) included in the market place (7) can be purchased by the users (9) via payment tools here. The users (9) can reach to the online platform where the second device (8) that they own is included in the market place (7). Second device (8) can be a mobile device such as a telephone, tablet etc. or can be a laptop or desktop computer.

The applications (6) added to the market place (7) can operate in a manner such that they can be integrated to each other like the toy block parts. Forming the applications (6) in such a manner plays an important role in fulfilling the variable requirements of the users (8).

In case the user (9) who purchases the application (6) is a company, the people using and displaying the application (6) in the same company can be different people. If the user (9) is an operator, this user (9) applies the results obtained by the application (6) to the production lines/machines (10). If a manager uses the application (6), then the user (9) follows the metrics of the usage and the benefits of the application (6).

The production system in the exemplary system basically comprises three parts: The production lines/machines (10), the sensors (11) and the PLCs (12).

The production lines/machines (10) are the systems that have mechanical components and are used in the manufacturing of any product/good. In addition, during the production process, the changes in the substances and/or the quantities (such as the air flow, ambient temperature etc.) that affect the behavior of mechanical components/systems are included within this scope and their effects can be calculated by the application (6), as well. As a result of processes carried out by the production lines/machines (10), industrial products are obtained.

Sensors (11) are the devices that can measure the temperature, pressure, force and similar values occurred within the environment. They give information about the surfaces/environment they are attached/positioned and are used for collecting information from the production lines/machines (10). Some sensors (11) are the integrated sensors which feed data to the control systems of the production lines/machines (10) and are purchased together with production lines/machines (10). Besides these, additional data can be obtained by installing additional sensors (11) to the production lines/machines (10). The measurements received from the integrated sensors or from the additional sensors (11), are introduced to the application (6) by API (1) and thus the behavior of the function embedded in the applications (6) and the behavior of the real production lines/machines (10) are matched. These measured values are introduced to the application (6) manually by the user (9). In addition, it is also possible to feed data automatically from the sensors (11) to the application (6) by connecting them with the help of API (1).

"Programmable Logic Controller" or (its abbreviation) PLC (12) which is used for controlling a device or a machine, benefits from the sensor data as an input. Production lines/machines (10) possess installed sensors to generate signals for PLC. The applications (6) here, use these sensors' measurements which provide data to PLC (12), thus the functions embedded in the applications (6) can be calibrated without additional sensors (11). Installing additional sensors (11) can enable formation of a digital twin with higher accuracy for some processes. It is possible to operate some applications (6) in the market place (7) with PLC (12) in an integrated manner. This integration process can be performed with the use of relevant API (1) function which is capable of connecting PLC (12) and applications (6). Therefore, the results of the calculations performed by the applications (6) can be fed directly to the production lines/machines (10) (without requiring the manual action of any personnel).

In the exemplary system, also performance indicator interface (13) is included as an interface showing a graph in order to submit information to the user (9). The changes in the data in this interface are shown in a graphical manner. The user (9) follows the levels of improvement in the production processes (changes in the parameters such as efficiency, the raw material consumption etc.) and the data (usage frequency, impact factor etc.) in respect to the usage of the application (6) through the performance indicator interface (13). The "Key Performance Indicator" metrics mentioned as KPI are presented to the user (9) on this interface. When multiple number of firms/users are connected to the platform over a private domain for creating an ecosystem, the metrics of these connected companies can be monitored through the performance indicator interface (13).

In the exemplary system, the applications (6) can be placed in an edge computing device (14) which is attached to the production lines/machines (10) or located in vicinity of the production lines/machines (10). When the edge computing devices (14) are utilized, the calculations in the applications (6) can be performed locally on these devices rather than in a server (2). The aim of benefitting the edge computing devices (14) is to perform calculations in a faster manner by eliminating data exchange between the sensors (11) and the server (2). After functions in the applications (6) are simplified and installed to an edge computing device (14), calculations can be performed on the device directly, with ceasing necessity of sending information to the server (2).

The invention uses physics and mathematics based scientific codes with a deterministic approach in order to develop a digital twin. These codes allow the users (9) to develop the required digital twin by themselves. The codes brought as API (1) are located in the server (2) and they are put into service with the developer interface (3) and the market place (7). Together with this infrastructure, the digital twins can be developed as applications (6) and they can be sold/purchased in the market place (7). Also, the metrics in respect to the usage of the application (6) can be tracked on the performance indicator interface (13). This system which consists of the scientific codes, the API (1), the server (2), the developer interface (3), the application (6), the market place (7) and the performance indicator interface (13) forms an online platform.

Figure 2:
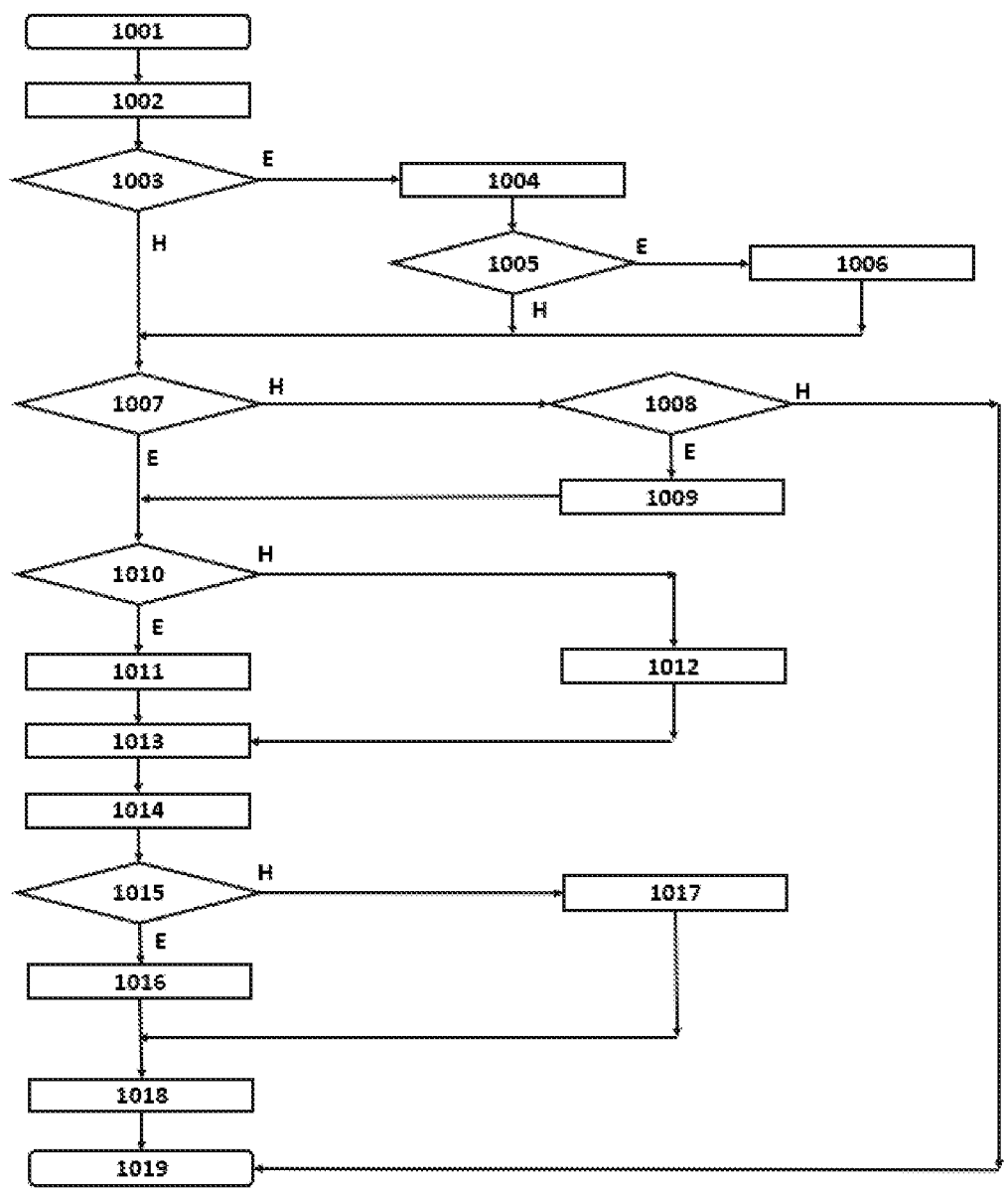
FIG. 2 is a flow chart of an exemplary embodiment of the computer-based calculation method subject to the invention.

In FIG. 2, a flow chart of the exemplary embodiment of the computer-based calculation method subject to the invention is given. The method essentially comprises the following process steps:

- entering to an online platform by the user (9) with a second device (8) which is owned by the user (9) (1001),
- entering to the market place (7) on an online platform by the user (9) in order to browse applications (6) which make engineering calculations (1002),
- querying the requested application (6) on the market place (7) by the user (9) (1007),
- matching the application to the production line/machine (10) which yields the digital twin of the system by the API (1) consisting built-in functions, solvers, mathematical codes, recursive codes and loops (1013)
- performing requested calculations with the digital twin application (6) by the user (9) (1014),
- introducing calculation results to the production system manually by the user (9) (1016) or automatically by the application (6),
- exiting out of the market place (7) by the user (9) (1019).

In a preferred embodiment of the inventive method, after the user (9) enters to the online market place (7) in order to browse the applications (6) which performs engineering calculations (1002), the server (2) queries whether the user (9) requires a private domain for using/developing his/her applications (6) or not (1003). As a result of the query, in case there is a private domain requirement; the server (2) performs user (9) subscription processes accordingly and allocates a private domain which enables the user (9) to keep his/her application private (6) (1004).

In case the user (9) requires a private domain; the server (2) can query whether the user (9) requires the ecosystem feature which enables interaction with other users or not (1005). In this case, if the user (9) requests an ecosystem characteristic; the server (2) integrates the partner companies included in the ecosystem to the private domain of the user (9) upon user's (9) approval (1006). After the user (9) subscribed to a specific application (6) (1014), if the ecosystem characteristic is active, then the user (9) can share the application (6) or results of the calculations performed by the application (6) with the other stakeholders in the ecosystem.

In another preferred embodiment of the method subject to the invention, after the user (9) queries the requested application (6) on the market place (7) (1007), in case the application (6) is not present in the market place (7); the API (1) asks to the user (9) whether requested applications (6) is required to be developed or not (1008). If the application (6), which is not present in the market place (7), is requested to be developed by the user (9); the developer (5), who is a member of freelancer community in the market place (7), develops the application (6) on the server (2) by means of a graphical interface (3) and API (1) (1009) and publishes the application (6) in the market place (7). When the application (6), which is not present in the market place (7), is not required to be developed by the user (9); the user (9) exits from the market place (7) (1019) and logs out. The user (9) and the developer (5) included here can be different or same persons. Therefore, the first device (4) used by developer (5) and the second device (8) that belong to the user (9) can be the same device.

The Process of Developing the Application (6) by the Developer (5) on the Server (2) by Means of a Graphical Interface (3) (1009) is Performed as Follows:

First of all, governing equations which represents the physical state of the machines processes in the production system are formed (1a). During the operation of the production system; the changes such as deformation, force, temperature, flow motion etc. are denoted in a mathematical form by means of the well-known physical equations in engineering literature. For example, one of the equations among these mathematical representations is the Navier-Stokes equations which model the motion of the fluids such as water, air etc. Flow velocities and flow distribution patterns can be obtained with the solution of Navier-Stokes equations for certain conditions.

In order to solve the physical equations mentioned as the second, numerical methods are used (1b). The mathematical methods such as the Finite Difference, Finite Volume, and Finite Element allow solving the complicated physical equations such as Navier-Stokes. For example, the distribution of the air flow from an air-conditioning device into the room can be calculated by Navier-Stokes equations with utilizing these numerical methods. These numerical methods and concerning algorithms are formed into a code and thus the physics problems are solved with the aid of the server (2).

In the next step, virtual tests are performed to generate data set with varying input parameters by Design of Experiment codes (1c), which is a systematic method to identify the relationship between factors affecting a process and the output of that process. Design of Experiments is performed with running physical equation codes in a repeated manner by varying input parameters (such as temperature, flow rate, etc.) in a predefined interval of parameters. When Design of Experiment code and physical equation codes are run together, a resultant data set which provides information about cause-and-effect relationship between input and output parameters is generated without requiring any sensor data or "Big Data". Set of data generated by the codes replaces "Big Data" that consists of measurements from sensors in the physical world.

The data set and relationship obtained by means of the Design of Experiments is required to be simplified for quick response of the application (6). In the next step, cause-and-effect relationship of the system reduces to a few simple functions by means of the Reduced Order Modeling, ROM process (1d).

Subsequently, in order to ensure the simple functions obtained by means of the Reduced Order Modeling represent the production lines/machines (10) with high accuracy, data collected from the few sensors on the production lines/machines (10) is used for tuning these functions and digital twin is obtained as a result of this calibration process (1e).

In the next step, optimum operation parameters are calculated by means of using Multi-Objective Optimization codes of the digital twin (1f). The capability of performing optimization in respect to various constraints such as minimum energy consumption, minimum raw material consumption, maximum quality, minimum cost etc. are provided to the users (9) by Multi-Objective Optimization codes.

The developers can add new features and capabilities to the API (1) to develop applications (6) with different options/methods that are not provided by the existing API (1). For example, the codes which include extra features such as the artificial intelligence can be added to the platform and served as a function of API (1).

In another preferred embodiment of the invention, after the user (9) queries the requested application (6) on the market place (7) (1007), the application (6) asks the user (9) whether the calibration process should be carried out manually or not (1010). In case manual calibration is preferred, the user (9) introduces data obtained from production lines/machines (10), the sensors (11) and the PLC (12) to the application (6) manually (1011). In case automatic calibration is preferred, the user (9) connects the production system to the application (6) (1012) and thus the calibration is performed by the application (6) automatically.

In another preferred embodiment of the invention, after the user (9) performs the required calculations with the digital twin application (6) (1014), the application (6) asks the user (9) whether the obtained results such as operation parameters should be manually applied to the production system or not (1015). In case manual implementation is preferred, the user (9) introduces the parameters received from the application (6) to the production system (1016). In this situation, the operator is required to take the relevant actions on the PLC (12) manually. In case automatic activation is preferred, the application (6) is connected to the production system (1017). The automatic actuation feature in API (1) connects the PLC (12) and the application (6) directly; and relevant actions are performed on the system automatically, thus the operator is not required take any action. Therefore, the results obtained by means of the application (6), for example optimum operation parameters for minimum raw material consumption, can be applied to the production lines/machines (10) automatically. When optimum parameters are applied to the production lines/machines (10), the line starts to operate in a more efficient manner.

In another preferred embodiment of the invention, after the user (9) applies the optimum operation parameters obtained as a result of the calculation to the production system, the user (9) monitors metrics in respect to the use of the application (6) and its impact on the performance of the production system through a performance indicator interface (13) (1018).

By the help of the advantages brought by the invention, the user (9) is able to create the application (6) which is the digital twin of the required production system by himself/herself by means of the developer interface (3) and a first device (4). As an alternative to this, the user (9) can benefit from the digital twin applications (6) which are developed by others and readily available in the market place (7). It is possible to adapt available applications (6) in the market place (7) to his/her own production system by calibration feature in the API (1). During calibration, the data received from the installed sensors (11) which feed data to the PLC of the production system are used. In case it is desired/required, additional sensors (11) can be installed to the system. In contrast to the current methods, by means of the usage of the scientific codes and technical approaches in the API (1), the calibration process of the digital twin application (6) to match production system can be made without requiring additional sensor (11).

The digital twins developed by the invention are formed by means of physical laws/equations rather than solely by the sensor (11) data. This approach allows analysis of the hypothetical situations. By means of the invention, for a planned novel operational action, in order to understand the effects of potential or actual changes to the system, there is no need to make experiments thereon. For example, by introducing the physical parameters of a new type of raw material to the application (6), the digital twin immediately adjusts itself to the new situation and performs calculations for this hypothetical case. In order to obtain an updated digital twin which is capable of reflecting behavior of the system with this new type of raw material; experiment or any physical changes on the production line is not required. For other approaches which benefit from Big Data Analytics, new type of raw material should be introduced into the production lines/machines (10) and data should be collected via sensors (11) in order to update the digital twin. Thus, the present invention enables users (6) to create/use digital twins which adapt to new conditions in a fast and efficient manner. With the use of adaptive digital twins; potential physical improvements, changes and upgrades in the production lines/machines (10) are simulated/tested digitally, without any need of physical action on the actual production lines/machines (10). So that, infrastructure costs and ineffective trials are eliminated.

What is claimed is:

1. A computer-based calculation method wherein a user enters an online platform by an owned second device (1001), subsequently to browse applications which make engineering calculations, the user enters to a market place in an online platform where applications are sold (1002), the method characterized by comprising the following steps:
   querying a requested application on the market place by the user (1007);
   matching the application to a production system which yields a digital twin of the production system by the API consisting built-in functions, solvers, mathematical codes, recursive codes and loops (1013);
   performing requested calculations with a digital twin application by the user (1014);
   taking actions on production lines/machines such as changing operation parameters by the user or by the application; and
   exiting out of the market place by the user (1019),
   wherein after the user performs the requested calculations by means of the application (1014), the application asks the user whether obtained operation parameters are applied to the production system manually or not (1015), together with this:
   if manual application is preferred, the user introduces the parameters received from the application to the production system (1016), and
   if automatic application is preferred, the application is connected to the production system (1017) and the application applies parameters itself.

2. A computer-based calculation method according to claim 1, wherein after the user enters the market place to browse applications which perform engineering calculations in the online platform where applications are sold (1002),
   a. a server queries whether the user requires a private domain for using/developing the application or not (1003), and
   b. as a result of the query, if private domain is required, the server performs user subscription processes in order for creating a private domain (1004).

3. A computer-based calculation method according to claim 2, wherein:
   a. if the user requires the private domain; the server queries whether the user requires an ecosystem characteristic which provides interaction with the other users or not (1005), and
   b. if the user requires the ecosystem characteristic, the server integrates partner companies in the ecosystem to the private domain of the user (1006).

4. A computer-based calculation method according to claim 3, wherein after the user performs the requested calculations by means of the digital twin application (1014), if the ecosystem characteristic is active, the user shares the application or results of the calculations with the other stakeholders in the ecosystem.

5. A computer-based calculation method according to claim 1, wherein after the user queries the requested application on the market place (1007):
 a. if the application requested by the user is not present in the market place, a server asks the user whether the requested application is required to be developed or not (1008),
 b. if the application which is not present in the market place is required by user to be developed, a developer develops the application by means of a graphical interface and API on the server (1009), and
 c. if the application which is not present in the market place is not required by the user to be developed, the user exits from the market place (1019).

6. A computer-based calculation method according to claim 5, wherein the user and the developer are the same person and thus a first device which is used by the developer and the second device which belongs to the user (9) is the same device.

7. A computer-based calculation method according to claim 5, wherein the process of developing the application on the server by means of the graphical interface by the developer (1009) comprises the following steps:
 a. forming equations which represent a physical state of the machine's processes in the production lines/machines (1*a*);
 b. using numerical methods in order to solve physical equations (1*b*);
 c. performing virtual tests to generate data set with varying input parameters by Design of Experiment codes (1*c*);
 d. simplifying data set with Reduced Order Modeling process, reducing an input-output relationship to a few simple functions (1*d*);
 e. matching a behavior of reduced functions to physical behavior of the system with sensor data from the production lines/machines and obtaining the digital twin by means of calibration thereof (1*e*); and
 f. calculating optimum operation parameters via calibrated digital twin by using multi-objective optimization codes (1*f*).

8. A computer-based calculation method according to claim 7, wherein the process of developing the application by means of a graphical interface on the server by the developer (1009) comprises the step of transforming the application into an API by adding supplementary codes.

9. A computer-based calculation method according to claim 1, wherein after the user queries the requested application on the market place (1007), with the application asks the user whether a calibration process is carried out manually or not (1010), together with this:
 a. if manual calibration is preferred, the user introduces the parameters and data collected from the production system comprises the production lines/machines, sensors and PLC to the application (1011) and,
 b. if automatic calibration is preferred, the user connects the production system to the application (1012).

10. A computer-based calculation method according to claim 1, wherein after the user introduces the operation parameters as a result of the calculation to the production system, the user monitors metrics in respect to the use of the application and application's impact on the performance of the production system through a performance indicator interface (1018).

* * * * *